H. D. A. MILLER.
EGG TURNING TRAY.
APPLICATION FILED JUNE 6, 1913.
1,123,567.
Patented Jan. 5, 1915.
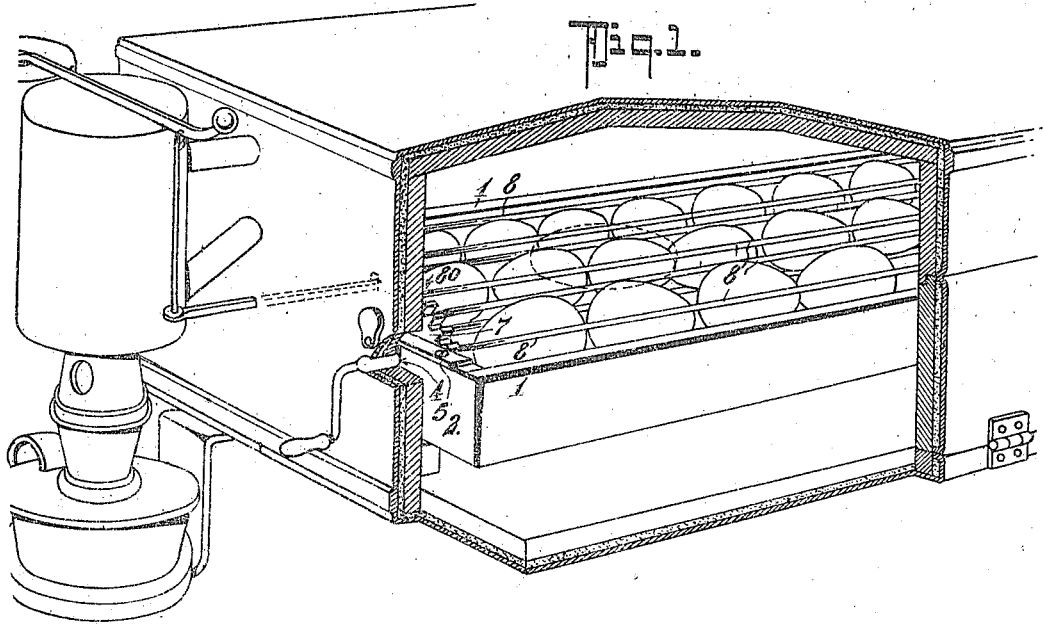
Fig. 1.
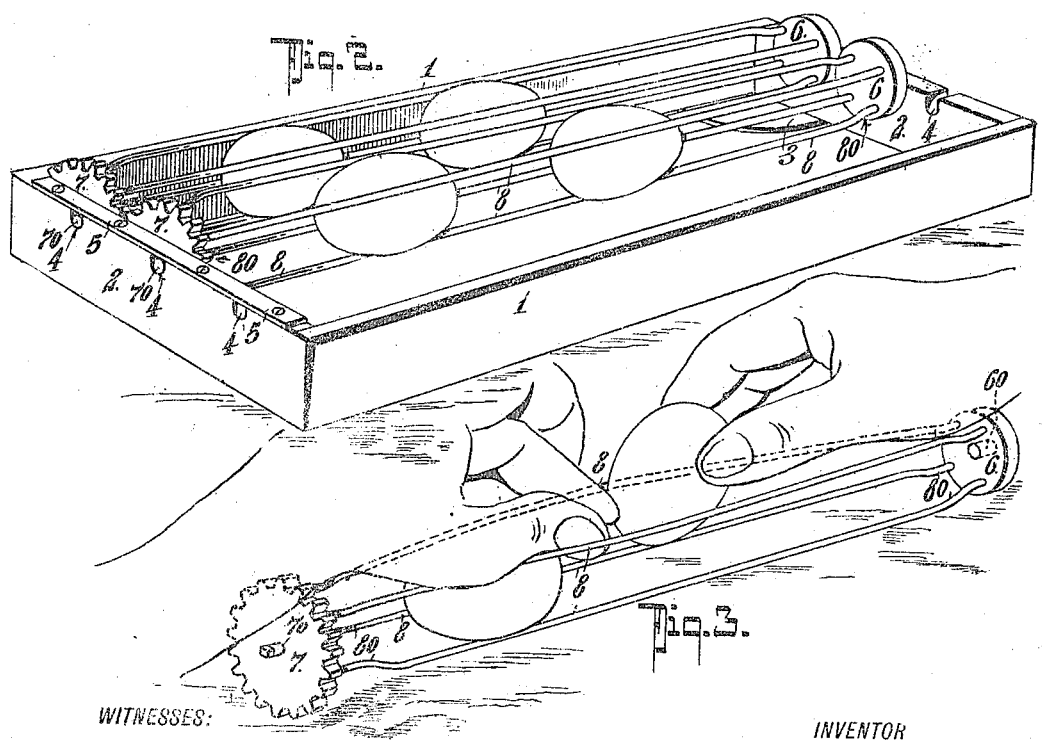
Fig. 2.
Fig. 3.
WITNESSES:
Haymond Woodard
Charles J. Diller
INVENTOR
Henry D. A. Miller,
BY
Fred J. Dieterich
ATTORNEYS

UNITED STATES PATENT OFFICE.

HENRY D. A. MILLER, OF CHEHALIS, WASHINGTON.

EGG-TURNING TRAY.

1,123,567.  Specification of Letters Patent.  Patented Jan. 5, 1915.

Application filed June 6, 1913. Serial No. 772,109.

*To all whom it may concern:*

Be it known that I, HENRY D. A. MILLER, residing at Chehalis, in the county of Lewis and State of Washington, have invented a new and Improved Egg-Turning Tray, of which the following is a specification.

My invention, which in a general way, refers to improvements in incubators, more particularly relates to the means, in an incubator, for supporting and turning the eggs during the process of incubating, and it primarily has for its object to provide a simple and inexpensive egg holding and turning tray, in which the eggs are so supported that all of the eggs held within the tray may be simultaneously and uniformly turned.

Another object of my invention is to provide an egg tray for incubators formed of a series of independent egg holders, having gear connections whereby all of the holders may be turned at the same time and the said holders so constructed and coöperatively combined that any one of the holders may be removed without damaging the other holders, the said holders being also so formed that any one of the eggs held therein can be conveniently removed or replaced without danger to the other eggs contained therein and such removal or replacing of the egg effected without disconnecting any of the several parts that constitute the holder.

With other objects in view, that will hereinafter appear, my invention is an egg holding and turning tray that embodies the peculiar arrangement of parts, all of which will hereinafter be explained, specifically pointed out in the appended claims and illustrated in the drawings, in which:

Figure 1 is a perspective view of my invention, so much of an incubator being shown as is necessary to illustrate the practical application of my invention. Fig. 2 is a perspective view of the tray, one of the holders being shown as being removed from the tray. Fig. 3 is a perspective view of one of the holders, the manner in which an egg is removed from or returned to the holder being shown.

In the practical arrangement, my improved tray in its simplest form, comprises a rectangular wooden frame formed of the sides 1—1 and lids 2—2, the corner joints of which are preferably reinforced by sheet metal angle plates 3—3 (see Fig. 2).

The tray is supported within the hot air chamber of the incubator in any approved manner. The ends of the tray have their upper edges formed with a plurality of equi-distantly spaced vertical sockets 4—4, which sockets at one end are closed by a metal strap plate 5. Within the tray frame is mounted a plurality of independently supported and movable egg holders, the peculiar construction of which forms an essential feature of my invention. Any desired number of holders may be used, three being shown, and they are so supported within the tray that they lie in close relation, are adapted for being removed from the tray without, in the slightest, disturbing those holders that remain within the tray.

Each egg holder consists of two end disks 6—7, one of which 7, is in the nature of a cog gear, and the cog gears of the several holders, when the latter is assembled in the tray intermesh as shown. Each gear 7 has a short pintle 70 that journals in the covered sockets 4 in one end of the tray and the disks 6, at the other end have like pintles 60 that are removably held in the open sockets in the adjacent end of the tray. One of the pintles 70 is extended to receive an actuating crank, the turning of which causes the several gears to intermesh and turn the holders.

Each egg holder includes a series of parallel longitudinal rods 8 transversely so separated to provide for a snug fitting of the eggs therebetween, the ends being held therein end to end to prevent the eggs at the opposite ends of the holder jarring against the end disks of the holders during the operation of turning them and thereby become broken, the ends of the rods 8 are turned down as at 80 to engage the rounded ends of the eggs, as shown. The rods 8 are resilient members, they being in the nature of spring rods of such resiliency that they may be readily separated by hand when it is desired to insert into or remove an egg from the holder, and to bear with sufficient tension on the eggs to effect their turning operations but without danger of crushing them. By providing the tray with a series of independently mounted holders, each of which is removably mounted on the tray, it follows, that any one of the holders with the eggs therein can be easily removed from the tray by lifting that end having the journal in the open socket, and then pulling the pintle at the other end out of its bearing. To remove the egg, the operator forces the rods apart with one hand sufficiently to permit of lifting the eggs singly, out of the holders with the other hand (see Fig. 3) the replacing of the eggs being likewise accomplished. As the rods 8 are very flexible, the entire holder with the eggs therein can be readily handled with little or no danger of breaking the eggs.

What I claim is:

1. In an egg tray, a frame, said frame having notched bearing recesses at its ends, a series of independent egg holders each including end disks, and stub shafts carried thereby to enter said bearing notches, a retaining plate at one end of the frame for holding the shafts in the adjacent notches, the end disks at one end of said holders having gear teeth to intermesh, longitudinal parallelly disposed rods extending from one end disk of a holder to the other end disk thereof and rigidly secured to the same, said rods being of resilient material whereby to permit them to be spread laterally for the insertion of the eggs and whereby the eggs will lie end to end in alinement with the longitudinal axis of the respective egg holder, all being arranged substantially as shown and for the purposes described.

2. In an incubator, an egg tray comprising a frame, and a plurality of egg holders each independently removably mounted in said frame, and each of said egg holders including a pair of end disks, and resilient bars connecting said end disks together, and stub shafts on said end disks, said frame having bearing recesses into which said stub shafts are adapted to be set, and removable means for holding the stub shafts at the end of the frame in their respective recesses, the end disks at one end of each holder being toothed whereby the several holders are geared together, and means whereby said holders may be turned on their stub shafts, said rods being yieldable whereby to permit them to be spread laterally for the insertion of the eggs, the egg receiving space between said rods being in longitudinal alinement with the axis of the respective holder, whereby when the holders are turned the eggs will be turned on their longitudinal axes.

HENRY D. A. MILLER.

Witnesses:
FLOYD M. HANCOCK,
EVA KNIGHT.